United States Patent [19]

Sopp et al.

[11] 4,443,425
[45] Apr. 17, 1984

[54] MAGNESIUM OXIDE COMPOSITION FOR COATING SILICON STEEL

[75] Inventors: Samuel W. Sopp, Foster City; Leonard S. Lee, South San Francisco; Michael W. Howe, Albany, all of Calif.

[73] Assignee: Calgon Corporation, Pittsburgh, Pa.

[21] Appl. No.: 328,965

[22] Filed: Dec. 9, 1981

[51] Int. Cl.³ ............................................. C01F 5/06
[52] U.S. Cl. ............................... 423/635; 23/293 R; 148/113
[58] Field of Search ................. 423/635, 636; 148/113

[56] References Cited

U.S. PATENT DOCUMENTS

| | | | |
|---|---|---|---|
| 2,385,965 | 9/1945 | Carpenter et al. | 148/7 |
| 2,394,047 | 2/1946 | Elsey et al. | 148/6 |
| 3,060,000 | 10/1962 | Snyder et al. | 423/636 |
| 3,583,887 | 6/1971 | Steger et al. | 148/27 |
| 3,697,322 | 10/1972 | Lee et al. | 148/102 |
| 3,841,925 | 10/1974 | Steger | 148/113 |
| 4,248,602 | 2/1981 | Niermann et al. | 423/303 |

FOREIGN PATENT DOCUMENTS 1460943  4/1974  United Kingdom .

Primary Examiner—O. R. Vertiz
Assistant Examiner—Wayne A. Langel
Attorney, Agent, or Firm—Martin L. Katz; Hesna J. Pfeiffer; R. Brent Olson

[57] ABSTRACT

The instant invention is directed to a magnesium oxide composition, for use in coating silicon steel, having a Citric Acid Activity of 50 to 200 seconds and a particle size of 90 percent finer than 325 mesh prepared from a blend of
(a) ground magnesium oxide having a Citric Acid Activity of greater than 200 to 2000 seconds and
(b) ground magnesium oxide having a Citric Acid Activity of 40 to 100 seconds.

The instant invention is also directed to a process for the production of a magnesium oxide composition, for use in coating silicon steel, having a Citric Acid Activity of 50 to 200 seconds and a particle size of 90 percent finer than 325 mesh, comprising:
(a) grinding to a 90 percent finer than 325 mesh
  (i) 20 to 60 percent by weight of a ground magnesium oxide having a Citric Acid Activity of greater than 200 to 2000 seconds and
  (ii) 40 to 80 percent by weight of a magnesium oxide having a Citric Acid Activity of 40 to 100 seconds and
(b) blending (i) and (ii) together.

5 Claims, 2 Drawing Figures

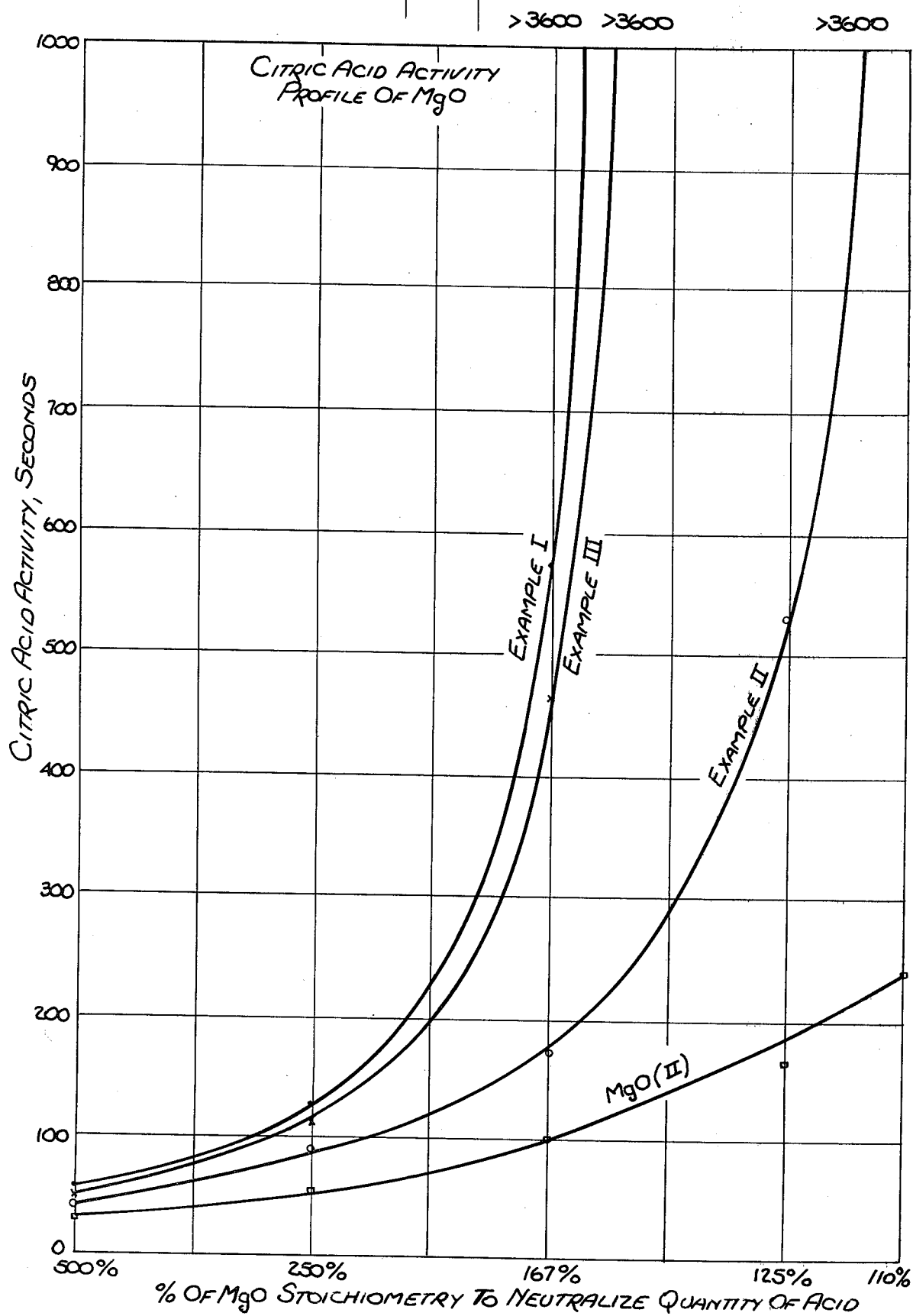

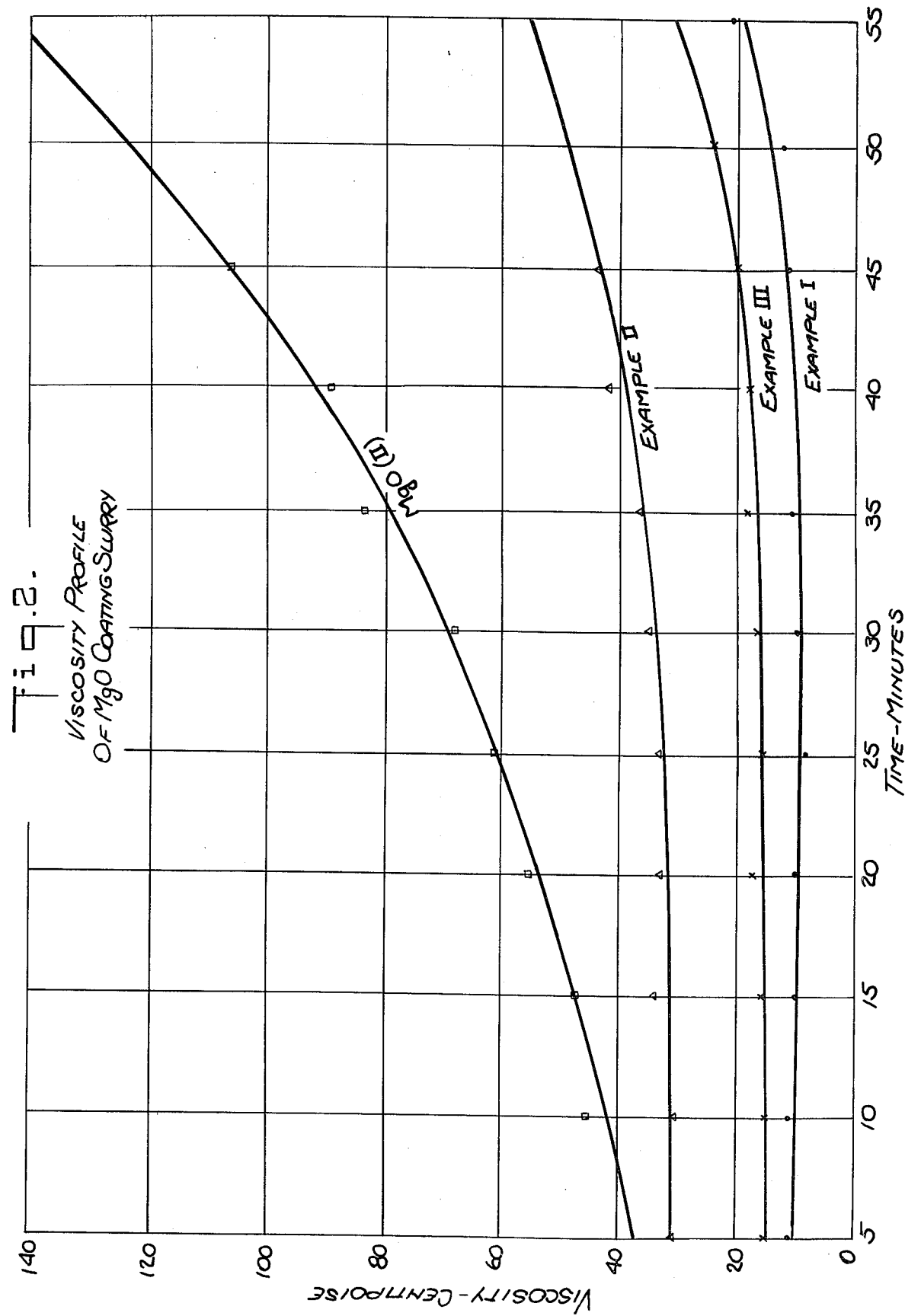

MAGNESIUM OXIDE COMPOSITION FOR COATING SILICON STEEL

BACKGROUND OF THE INVENTION

In many fields of use and, in particular, in the electrical industry, it is necessary to provide a coating on ferrous material. This coating desirably performs the function of separating and purifying the ferrous material and reacting with surface silica in the steel to form an electrical insulating layer. For example, in the transformer art, the cores of the transformers are usually formed of a ferrous material, such as silicon steel, which may be provided with a preferred grain growth orientation to provide optimum electrical and magnetic properties. It has been found necessary to provide a coating on the ferrous material prior to the final high temperature grain growth anneal. This coating will perform three separate functions. The first function of the coating is to provide separation of the various turns or layers of the coiled material to prevent their sticking or welding together during high temperature anneals. A second function is that of aiding in the chemical purification of the ferrous material to develop the desired optimum magnetic characteristics of such material. The third function of the coating is to form on the surface of the ferrous material a refractory-type coating which will provide electrical insulation of one layer of ferrous material from the next during its use as a core in a transformer or in other electrical apparatus, such as motor armatures or the like.

In the present state of the electrical apparatus art, the most widely used coating for the ferrous material which is used as the magnetic core of the electrical apparatus is a coating of magnesium oxide and/or magnesium hydroxide. These coatings are, in general, applied to the ferrous material in the form of a suspension of magnesium oxide and/or magnesium hydroxide in water. The suspension comprises a quantity of magnesium oxide in water and is mixed sufficiently for the desired application: the magnesium oxide being hydrated to an extent dependent on the character of the oxide used, the duration of mixing and the temperature of the suspension. Therefore, the term magnesium oxide coating is with reference to a coating of magnesium hydroxide, which may include magnesium oxide which has not been hydrated.

As set forth in U.S. Pat. No. 2,385,332, during a heat treatment at suitable temperatures, magnesium oxide can be caused to react with silica particles on or near the surfaces of previously oxidized silicon-iron sheet stock to form a glass-like coating, which coating is useful as an interlaminary insulator in the use of silicon-iron in electrical apparatus, e.g. in the cores of transformers.

In the production of silicon steel for the magnetic cores of transformers, the steel is generally annealed to provide optimum grain growth orientation which develops the magnetic properties of the silicon steel. This anneal is usually carried out in a dry hydrogen atmosphere at temperatures ranging from approximately 950° to 1500° C. from about 2 to about 50 hours. This anneal also aids in purifying the steel, aided by the coating placed on the steel. During this anneal, a portion of the magnesium oxide coating reacts with the silica on the surface of the silicon steel to form a glass-like coating of magnesium silicate. This glass-like coating provides electrical insulation during the use of the silicon steel in electrical apparatus, e.g. in the cores of transformers.

U.S. Pat. No. 3,841,925 discloses MgO compositions having a Citric Acid Activity (CAA) of 30 to 85 seconds, a pore volume of 0.20 to 0.1 cc/g and containing small amounts of a chloride contributor, such as $MgCl_2$, and sodium metasilicate. These compositions are designed to prevent hydration, or formation of magnesium hydroxide from the MgO. The value of this property, insofar as the reference is concerned, is to improve adherence of the dried unannealed coating of MgO, and consequently, the quality of the annealed coating.

British Pat. No. 1,460,943 is also directed to MgO compositions which have a particle size distribution of 92 to 99 percent passing through a 325 mesh screen. This patent is directed to improvement in adhesion of the final annealed film. This patent is silent as to the effect of Citric Acid Activity on the final film. In the instant invention, the Citric Acid Activity was found to be a critical factor in limiting the hydration rate in the aqueous slurry bath.

The instant invention is directed to a MgO composition which eliminates "tight magnesia", or excess MgO which sinters tightly to the annealed coating (glass film) while minimizing the hydration rate in the aqueous coating bath.

A portion of the magnesium oxide coating reacts with the surface silica to form a glass-like magnesium silicate coating. The unreacted portion remains as excess MgO which must be removed prior to further processing. Generally, this removal is accomplished by mechanical scrubbing with nylon bristle brushes or the like. After scrubbing, if there is a residue it is termed "tight magnesia", and is undesirable.

There are, of course, other properties for the annealed coating which must be present, but the composition of this invention is directed to minimizing "tight magnesia" while maintaining all the other desirable characteristics.

BRIEF DESCRIPTION OF THE DRAWINGS

FIG. I is a Citric Acid Activity profile of the instant MgO composition.

FIG. II is a viscosity profile of MgO coating slurry.

DESCRIPTION OF THE INVENTION

It has now been found that a MgO composition which provides all the desired properties while minimizing "tight magnesia" has the following properties: a Citric Acid Activity (CAA) of 50 to 200 seconds, preferably 80 to 180 seconds, particle size of greater than 90 percent through 325 mesh, a sharply rising CAA profile and a flat viscosity/time profile. This MgO, when coated onto silicon steel as an aqueous slurry or suspension, and annealed, is highly useful as an insulating surface.

The MgO composition of this invention is prepared by blending two different MgO materials, one having a very high CAA (>200 to 2000 seconds), the other a low CAA (40 to 100 seconds). The best blend is a 60:40 (weight:weight) blend of the low CAA material to the high CAA material. Both high and low CAA materials are ground before blending to the desired particle size distribution, 90 to 100 percent through 325 mesh.

This blended MgO exhibits a sharply rising CAA profile, and a flat viscosity/time curve.

More details are provided in the following examples:

EXAMPLE 1

Preparation of Inactive MgO (I):

One hundred pounds of Mg(OH)$_2$ granules were calcined in a muffle furnace at 1000° C. for 1 hour. The resulting granules were pulverized in a hammermill. The citric acid activity was 450 seconds. The particle size was found to be 99.0 percent minus 325 mesh.

Preparation of MgO (II):

Mg(OH)$_2$ granules were calcined in an externally-fired rotary kiln at 1000° C. Retention time in the kiln was about 30–40 minutes. The granules were pulverized in a Mikroatomizer to a particle size of 99.8 percent minus 325 mesh. The citric acid activity of the MgO was 70 seconds.

Preparation of Coating Slurry:

A coating slurry was prepared by mixing 20 pounds of (I), 30 pounds of (II) and 50 gallons of deionized water. The slurry was coated onto a coil of grain-oriented silicon steel, measuring 33 inches in width and 0.011 inches in thickness and dried in a continuous drying oven prior to re-coiling. The coating weights of top and bottom surfaces were 4.30 g/m$^2$ and 3.60 g/m$^2$, respectively. For comparative purposes, a similar coil was coated using 50 pounds of (II), 50 gallons of deionized water and processed in the same manner. Both coils were annealed in a box-annealing furnace under dry hydrogen atmosphere for about 30 hours at 1200° C.

After annealing and cooling, the excess coating was scrubbed off with nylon brushes. It was discovered that the coil coated with the composition containing (I) and (II) did not have tight magnesia, while the coil coated with MgO (II), alone, had areas of tight magnesia which could not be scrubbed off.

EXAMPLE 2

A coating slurry was prepared by mixing 10 pounds of MgO (I), 40 pounds of MgO (II) and 50 gallons of deionized water. The preparations of these MgO materials were identical to those mentioned in Example 1. The slurry was coated onto a coil of grain-oriented silicon steel, measuring 33 inches in width and 0.011 inches in thickness, and dried in a continuous drying oven prior to re-coiling. The coating weights of the top and bottom surfaces were 4.58 g/m$^2$ and 3.88 g/m$^2$, respectively. For comparative purposes, a similar coil was coated using 50 pounds of MgO (II), 50 gallons of deionized water and processed in the same manner. Both coils were annealed in a box-annealing furnace under dry hydrogen atmosphere for about 30 hours at 1200° C.

After annealing and cooling, the excess coating was scrubbed off with nylon brushes. It was discovered that the coil coated with the composition containing (I) and (II) did not have tight magnesia and had very good glass film. The coil coated with (II), alone, had areas of tight magnesia which would not be scrubbed off with the nylon brushes.

EXAMPLE 3

Preparation of Inactive MgO (III):

One hundred pounds of Mg(OH)$_2$ granules were calcined in a muffle furnace at 1200° C. for 2 hours. The resulting granules were pulverized in a hammermill to a particle size of 99.5 percent minus 325 mesh. The Citric Acid Activity was >1800 seconds.

Preparation of MgO (IV):

One hundred pounds of Mg(OH)$_2$ granules were calcined in a muffle furnace at 1000° C. for 20 minutes. The granules were pulverized in a hammermill to a particle size of 96.8 percent minus 325 mesh. The citric acid activity of the MgO was 71 seconds.

Preparation of Coating Slurry:

A coating slurry was prepared by blending 20 pounds of (III) and 30 pounds of (IV) in a ribbon blender. The powder was charged into a mixing tank containing 45 gallons of deionized water and mixed for 5 minutes. The resultant slurry was coated onto a silicon steel coil, dried in a drying furnace and annealed in a continuous annealing furnace. For purposes of comparison, 50 pounds of (IV) and 45 gallons of deionized water were used to produce a suspension and coated onto a similar coil, dried and annealed in the same manner.

After annealing and cooling, the coils were scrubbed using water and nylon brushes. We found that the coil coated with a composition containing (III) and (IV) gave a clean surface with no tight magnesia. The coil coated with (IV), alone, gave visible areas of tight magnesia and had to be pickled with acid.

EXAMPLE 4

A powder sample containing 40 parts per hundred parts of MgO (III) and 60 parts per hundred parts of MgO (IV) had the following analyses:

| | |
|---|---|
| MgO (percent) | 97.8 |
| Ignition Loss (percent) | 1.0 |
| CAA, 2 g (seconds) | 180 |
| Cl (percent) | 0.011 |
| SO$_4$ (percent) | 0.41 |
| SiO$_2$ (percent) | 0.005 |
| CaO (percent) | 0.44 |
| Na (percent) | 0.005 |
| B (percent) | 0.081 |
| Fe$_2$O$_3$ (percent) | 0.079 |

Citric Acid Activity Profile Test (CAAP)

The Citric Acid Activity (CAA) test is widely used in the steel industry to measure the activity of magnesium oxide for silicon steel coating application. It measures the time required for a given weight of MgO to neutralize 100 ml of 0.4N Citric Acid to the phenolphthalein end point. The test is generally run using a quantity of magnesium oxide in excess of the stoichiometric amount required to neutralize the quantity of citric acid. A 2 g test (250 percent of stoichiometry) is mentioned in British Pat. No. 1,442,730. In the CAA profile test, five tests were run using 110 percent, 125 percent, 167 percent, 250 percent and 500 percent of the stoichiometric quantity of magnesium oxide needed to neutralize 100 ml of 0.4N acid. Based on these percents of stoichiometry, the quantity of acid specified in the CAA test will neutralize 90%, 80%, 60%, 40% and 20% of the MgO sample when it reaches the phenolphthalein end-point. For ease of expression, the CAA Profile Test is plotted as PERCENT OF SAMPLE REQUIRED TO NEUTRALIZE 100 ml. of 0.4N CITRIC ACID vs. TIME, in seconds, as illustrated in FIG. 1.

The test was run according to the following procedure:

1. An 8-ounce wide mouth jar containing 100 ml of 0.400N Citric Acid and 2 ml of 1 percent phenolphthalein indicator was heated to 30° C. in a constant temperature water bath.

2. 4.05 g of MgO (500 percent of stoichiometry) was simultaneously put into the jar of citric acid and a stop watch started. The jar was shaken from the 5-second point to the 10-second point.

3. The jar was placed on a magnetic stirrer and allowed to stir until the suspension turned pink. The time, in seconds, required to turn the solution pink was the citric acid activity (CAA).

4. Similarly, 2.03 g, 1.35 g, 1.01 g and 0.90 g of MgO was added and the test repeated.

The Citric Acid Activity profiles of Examples 1, 2, 3 and MgO (II) are illustrated in FIG. I. The CAA was plotted against 20 percent, 40 percent, 60 percent, 80 percent and 90 percent of the amount of sample required to neutralize 100 ml 0.4N Citric Acid.

Viscosity of Magnesia

Magnesium oxide suspension, used in coating silicon steel, generally is maintained at a viscosity which allows the slurry to remain in suspension and which is suitable for coating. The unit of viscosity measurement depends on the instrument and the specified operating parameters. Magnesium oxide slurry used in coating silicon steel generally will increase in viscosity with increased time due to its inherent characteristic of hydration to form magnesium hydroxide. This characteristic may cause problems during the coating operation.

The instant MgO composition had the advantage of giving a relatively stable viscosity during the coating operation, as illustrated in FIG. II, using the Viscosity Profile Test.

Viscosity Profile Test

Five hundred ml of deionized water was placed in a Waring blender and 50 g of MgO was added. It was covered and mixed on low speed for 1 minute. The viscosity of the slurry was measured with a Brookfield Viscometer, Model LVT, using a No. 1 Spindle at 60 RPM. The viscosity was recorded in centipoise, every 5 minutes, up to 50 minutes.

FIG. II plots time (in minutes) vs. viscosity (in centipoise).

As illustrated in FIGURE II, the viscosity profile of MgO (II) indicates a rapid rise in viscosity with time. The profiles of Examples 1, 2 and 3 show relatively flat profiles. This is a definite advantage in the coating process.

What is claimed is:

1. A magnesium oxide composition, for use in coating silicon steel, having a Citric Acid Activity of 50 to 200 seconds and a particle size of 90 percent finer than 325 mesh, comprising a blend of
    (a) ground magnesium oxide having a Citric Acid Activity of greater than 200 seconds and
    (b) ground magnesium oxide having a Citric Acid Activity of 40 to 100 seconds.

2. The magnesium oxide composition of claim 1, wherein said blend is 20 to 60 percent by weight of (a) and 40 to 80 percent by weight of (b).

3. The magnesium oxide composition of claim 1, prepared from a blend of
    (a) ground magnesium oxide having a Citric Acid Activity of greater than 200, but not in excess of 2000 seconds and
    (b) ground magnesium oxide having a Citric Acid Activity of 40 to 100 seconds.

4. A process for the production of a magnesium oxide composition, for use in coating silicon steel, having a Citric Acid Activity of 50 to 200 seconds and a particle size of 90 percent finer than 325 mesh, comprising:
    (a) grinding to a 90 percent finer than 325 mesh
        (i) 20 to 60 percent by weight of a ground magnesium oxide having a Citric Acid Activity of greater than 200 seconds and
        (ii) 40 to 80 percent by weight of a ground magnesium oxide having a Citric Acid Activity of 40 to 100 seconds and
    (b) blending (i) and (ii) together.

5. The process of claim 4, wherein said 20 to 60 percent, by weight, of a ground magnesium oxide has a Citric Acid Activity of greater than 200, but not in excess of 2000 seconds.

* * * * *